United States Patent

Yamaguchi

Patent Number: 5,226,167
Date of Patent: Jul. 6, 1993

[54] MICROCOMPUTER CIRCUIT FOR ATTENUATING OSCILLATIONS IN A RESONANT CIRCUIT BY REVERSING PHASE AND FEEDING BACK RESONANT CIRCUIT OUTPUT OSCILLATION VOLTAGE

[75] Inventor: Atsuo Yamaguchi, Itami, Japan

[73] Assignee: Mitsubishi Denki Kabushiki Kaisha, Tokyo, Japan

[21] Appl. No.: 505,462

[22] Filed: Apr. 6, 1990

[30] Foreign Application Priority Data

Dec. 21, 1989 [JP] Japan ............... 1-329464

[51] Int. Cl.⁵ ............... G06F 3/00
[52] U.S. Cl. ............... 395/800; 235/449; 364/932.8; 364/925.6; 364/DIG. 2; 364/232.8
[58] Field of Search ............... 395/800; 329/319; 332/107, 123, 159; 341/24, 181; 235/449; 455/114

[56] References Cited

U.S. PATENT DOCUMENTS

| | | | |
|---|---|---|---|
| 3,982,243 | 9/1976 | Gustavsson et al. | 342/50 |
| 4,266,201 | 5/1981 | Belfatto | 332/9 |
| 4,319,359 | 3/1982 | Wolf | 375/22 |
| 4,481,672 | 10/1984 | Watkinson | 455/108 |
| 4,549,094 | 10/1985 | Floyd | 307/247 |
| 4,564,954 | 1/1986 | Nihaya et al. | 381/51 |
| 4,618,985 | 10/1986 | Pfeiffer | 381/51 |
| 4,701,711 | 10/1987 | Willard et al. | 324/322 |
| 4,858,203 | 8/1989 | Hansen | 367/103 |
| 4,866,736 | 9/1989 | Bergmans | 375/18 |
| 5,013,898 | 5/1991 | Glasspool | 235/449 |
| 5,031,195 | 7/1991 | Chevillat et al. | 375/14 |

FOREIGN PATENT DOCUMENTS 0170716 2/1986 European Pat. Off. .
0217654 4/1987 European Pat. Off. .

OTHER PUBLICATIONS

"Non-contact IC card utilizing light for data communication", Nikkei Electronics 1988, 10. 3, No. 457, pp. 197-202.

Primary Examiner—Thomas C. Lee
Assistant Examiner—Paul Harrity
Attorney, Agent, or Firm—Leydig, Voit & Mayer

[57] ABSTRACT

A microcomputer for driving a resonant circuit includes a CPU for processing data, an input circuit for detecting an input signal and for transmitting it to the CPU, an output circuit for outputting an output signal from the CPU to the resonant circuit, and attenuation device for attenuating oscillation in the resonant circuit after the output signal from the CPU is turned off. In a non-contact IC card the resonant circuit is an antenna for sending and receiving data to and from the outside without contact.

6 Claims, 5 Drawing Sheets

F I G. 1
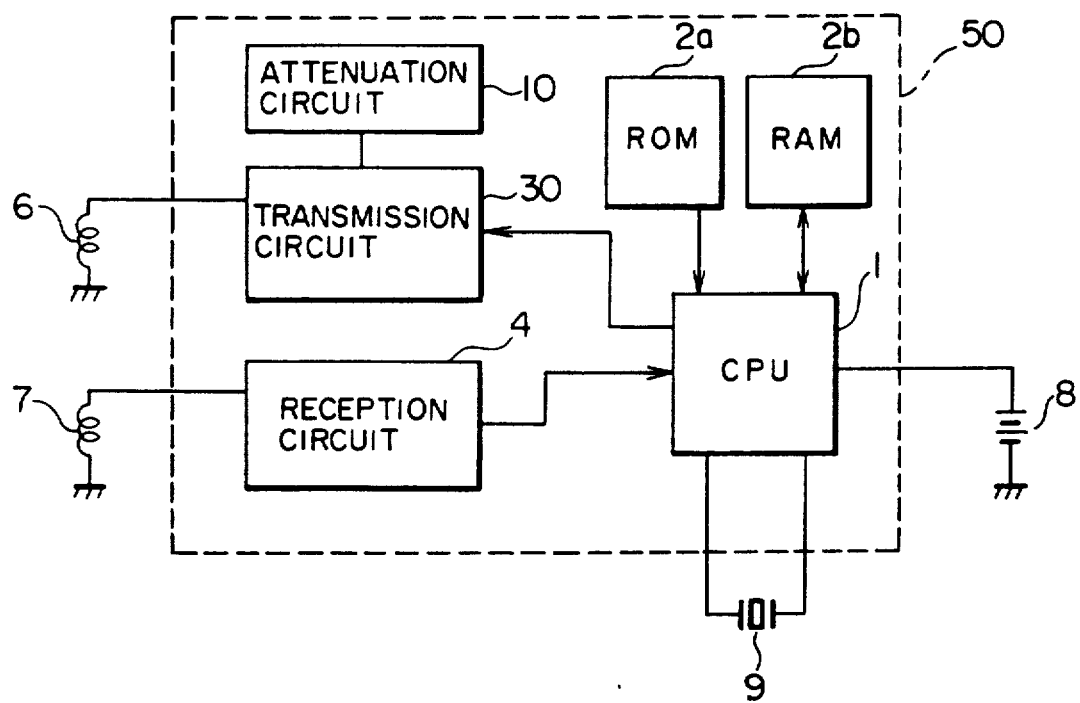

MICROCOMPUTER CIRCUIT FOR ATTENUATING OSCILLATIONS IN A RESONANT CIRCUIT BY REVERSING PHASE AND FEEDING BACK RESONANT CIRCUIT OUTPUT OSCILLATION VOLTAGE

BACKGROUND OF THE INVENTION

1. Field of the Invention

This invention relates to a microcomputer and a non-contact IC card using the same.

2. Description of the Related Art

The structure of a conventional non-contact IC card is shown in FIG. 6. A CPU 1 is connected with a ROM 2a, a RAM 2b, a transmission circuit 3, and a reception circuit 4, all contained within a microcomputer 5. The transmission circuit 3 and the reception circuit 4 of the microcomputer 5 are connected with a data transmission antenna 6 and a data reception antenna 7, respectively. The CPU 1 is connected with a battery 8 and an oscillator 9. The whole IC card is sealed with resin or the like in order to improve resistance to the environment.

A power supply voltage is supplied to the CPU 1 from the battery 8, and a clock signal is supplied to the CPU 1 from the oscillator 9, causing the CPU 1 to be actuated on the basis of a program stored in the ROM 2a. The IC card sends and receives data to and from the outside using electromagnetic waves. At the time of data reception, electromagnetic waves from the outside are received by the reception antenna 7 and decoded to data by the reception circuit 4, after which they are input to the CPU 1. Data processing is performed in the CPU 1, and data is stored in the RAM 2b when needed. On the other hand, at the time of data transmission, data from the CPU 1 is output to the transmission circuit 3. At this point, carrier waves are coded with this data and sent from the transmission antenna 6.

An example of the configuration of the transmission circuit 3 is shown in FIG. 7. A capacitor 11 is connected in parallel with the transmission antenna 6, and these elements constitute a resonant circuit 12. The resonant circuit 12 is connected with the output terminal of the gate circuit 15 via a resistor 13 and a transistor 14. One input terminal of the gate circuit 15 is connected with the CPU 1, and a transmission signal indicating data and carrier waves are input to another terminal of the gate circuit 15 from the CPU 1.

In the transmission circuit 3, shown in FIG. 8, when a transmission signal of "H" level is output to the gate circuit 15 from the CPU 1 at time $t_1$, the transistor 14 is turned on by the carrier wave. Then, the resonant circuit 12 is activated and electromagnetic waves are launched from the transmission antenna 6. On the other hand, when a transmission signal is at "L" level, as at time $t_0$, the transistor 14 is off. Therefore, the resonant circuit 12 is not activated and electromagnetic waves are not sent. In this way, electromagnetic waves are modulated by a transmission signal and transmitted.

However, as shown in FIG. 8, although when the level of the transmission signal changes from "H" to "L" at time $t_2$, the transistor 14 goes off instantly, the oscillations between time $t_1$ to $t_2$ in the resonant circuit 12 only gradually decay. Therefore, a long period of time $\Delta t$ is required from the time the level of a transmission signal becomes "L" to the time the oscillation in the resonant circuit 12, namely, the electromagnetic waves sent from the transmission antenna 6, disappear.

To accurately transmit data, a pulse must be transmitted only after the oscillations of the previous pulse of a transmission signal decrease to negligible magnitude. Because of this requirement, the speed of data transmission is slow in the prior art.

SUMMARY OF THE INVENTION

The present invention has been devised to solve this problem. An object of the present invention is provide to a microcomputer capable of driving a resonant circuit accurately at high speed.

Another object of the present invention is provide a non-contact IC card transmitting data at high speed and accurately using a microcomputer.

The microcomputer of the present invention is one which drives a resonant circuit. It comprises a CPU for processing data, an input circuit for detecting an input signal and transmitting the signal to the CPU, an output circuit for outputting an output signal from the CPU to the resonant circuit, and an attenuation means for attenuating oscillations in the resonant circuit when the output signal from the CPU changes from on to off. The attenuation means can be structured to feed back the output voltage to the resonant circuit. Furthermore, the attenuation means can be structured to drive the resonant circuit by a reverse phase according to the output voltage from the resonant circuit.

The non-contact IC card of the present invention comprises an antenna for transmitting and receiving data to and from the outside without contact, a CPU for processing data, a reception circuit for inputting data to the CPU upon detection of a reception signal at the antenna, a transmission circuit for transmitting the transmission signal from the CPU to the outside via the antenna, and an attenuation means for attenuating oscillation generated in the antenna when the transmission signal from the CPU changes from on to off.

BRIEF DESCRIPTION OF THE DRAWINGS

These and other objects, features, and advantages of the present invention will become clear by the following description of a preferred embodiment of the present invention with reference to the accompanying drawings, wherein:

FIG. 1 is a block diagram illustrating the structure of a non-contact IC card in one embodiment of the present invention;

DETAILED DESCRIPTION OF THE PREFERRED EMBODIMENTS

Figure 2:
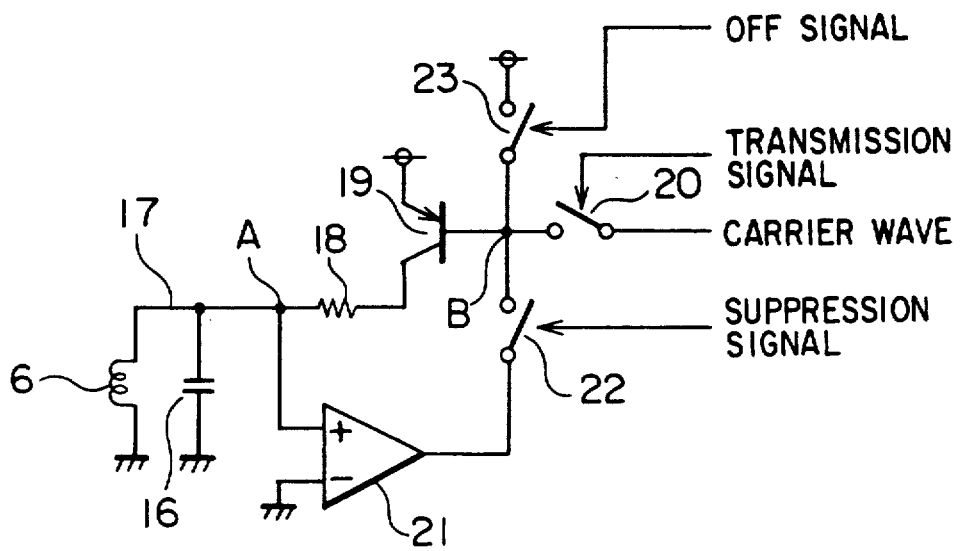
FIG. 2 is a view of a circuit illustrating a reception circuit and the attenuation circuit in a microcomputer used in the embodiment.

The embodiments of the present invention will be explained hereinunder with reference to the accompanying drawings.

In FIG. 1, a non-contact IC card includes a microcomputer 50, a data transmission antenna 6, a data reception antenna 7, a battery 8, and an oscillator 9. The microcomputer 50 is fabricated in one IC chip and includes a CPU 1 for processing data. This CPU 1 is connected with a ROM 2a, a RAM 2b, a transmission circuit (output circuit) 30, and a reception circuit (input circuit) 4. The transmission circuit 30 is connected with an attenuation circuit 10, an attenuation means. The transmission circuit 30 and the reception circuit 4 of the microcomputer 50 are connected with a data transmission antenna 6 and a data reception antenna 7, respectively. The CPU 1 is connected with the battery 8 and the oscillator 9.

A program for actuating the CPU 1 is stored in the ROM 2a. Further, the whole non-contact IC card is sealed with resin or the like to improve resistance to the environment.

The internal structures of the transmission circuit 30 and the attenuation circuit 10 are shown in FIG. 2. A capacitor 16 is connected in parallel with the transmission antenna 6 as resonant circuit 17 for transmitting electromagnetic waves of a predetermined frequency. This resonant circuit 17 is connected with a switching circuit 20 via a resistor 18 and a transistor 19, and the switching circuit 20 is connected with the CPU 1. The capacitor 16, the resistor 18, the transistor 19, and the switching circuit 20 comprise the transmission circuit 30. The connection point A between the resonant circuit 17 and the resistor 18 is connected with the positive sense input terminal of a comparator 21. The negative sense input terminal and the output terminal of the comparator 21 are, respectively, grounded and connected with the connection point B between the base of transistor 19 and the switching circuit 20 via a switching circuit 22. Further, a switching circuit 23 is connected between the connection point B and the power supply line. The comparator 21 and the switching circuits 22 and 23 comprise an attenuation circuit 10.

Figure 3:
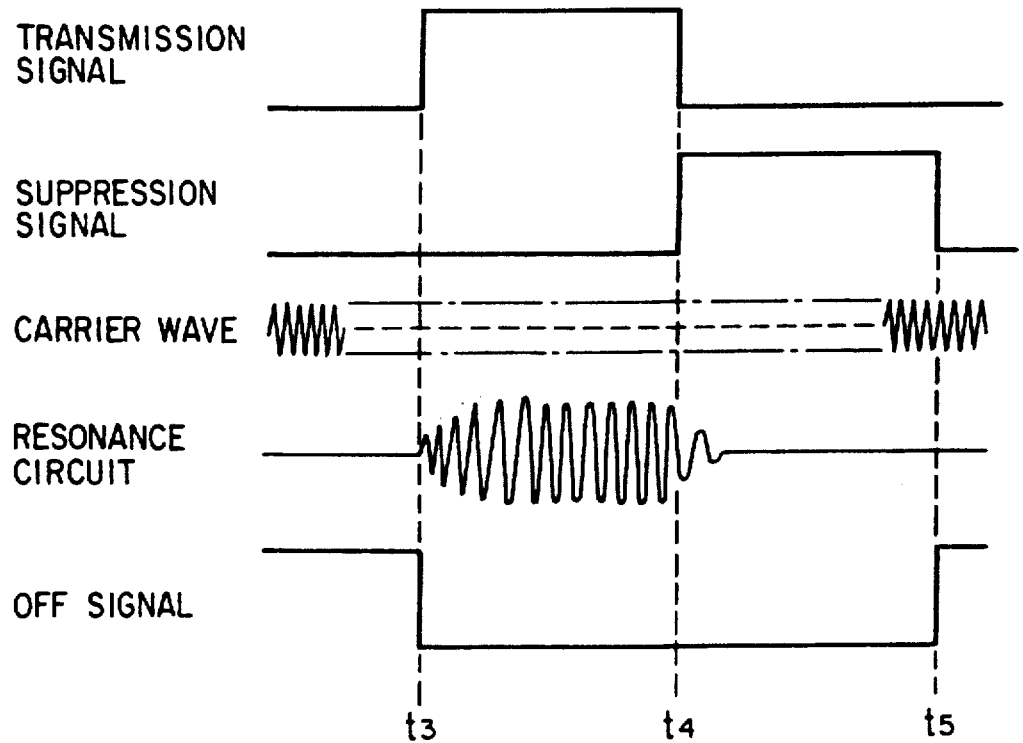
FIG. 3 is a signal waveform for each section of the circuit of FIG. 2.

The opening and closing of the switching circuits 20, 22, and 23 are controlled by a transmission signal, a suppression signal, and an off signal, respectively, which are output from the CPU 1. The switching circuits respectively close when these signals are at "H" level. A transmission signal is a signal indicating the transmission of data. As shown in FIG. 3, the suppression signal switches to "H" from "L" when the transmission signal changes from the "H" level to the "L" level and returns to the "L" level again after a predetermined time has elapsed. The off signal is "L" when either the transmission signal or the suppression signal is at "H" level and is "H" when both signals are at "L" level.

Next, the operation of this embodiment will be explained. When the CPU 1 is supplied with a power-supply voltage $V_{cc}$ from the battery 8 and with a clock signal from the oscillator 9, the CPU 1 operates on the basis of a program stored in the ROM 2a.

For data transmission, for example, when a transmission signal of an "H" level is output to the transmission circuit 30 at time $t_3$ shown in FIG. 3, the switching circuit 20 is closed and a carrier wave is applied to the transistor 19 from the CPU 1. As a result of this, the transistor 19 is turned on, causing the resonant circuit 17 to be activated and electromagnetic waves are sent to the outside.

At a later time, when the transmission signal goes to "L" at time $t_4$, the switching circuit 20 is opened and the suppression signal goes to "H" from the "L" level at the same time, causing the switching circuit 22 to be closed. As a result of this, the output from the comparator 21 is applied to the transistor 19. At this time, in the resonant circuit 17, the oscillation generated during the time $t_3$ to $t_4$ attenuate the remaining oscillations. When this oscillation is in a positive half cycle, the output of the comparator 21 goes to "H" and the transistor 19 is turned off. However, when the free oscillation in the resonant circuit 17 is in a negative half cycle, the output of the comparator 21 goes to "L", thereby causing the transistor 19 to turn on. For this reason, the voltage is fed back in a reverse phase to the resonant circuit 17, and the energy stored in the resonant circuit 17 is consumed. As a result of this, as shown in FIG. 3, the vibration in the resonant circuit 17 is attenuated rapidly after time $t_4$ and quickly becomes stable.

After that, when the suppression signal goes to "L" at time $t_5$ and both the transmission signal and the suppression signal go to "L", the off signal goes to "H" from the "L" level. On account of this, the switching circuit 23 is closed and the transistor 19 is turned off completely.

Since it is arranged that when the voltage of the resonant circuit 17 is positive, the transistor 19 is placed in the off-state, and when negative, the driving performance of the transistor 19 is increased using the value of the voltage of the resonant circuit 17, the free oscillation in the resonant circuit 17 are attenuated in a short time and undesired oscillations in the transistor 19 are prevented. Accordingly, the speed of data transmission can be increased, the Q of the resonant circuit 17 is increased, and circuit design at the receiving side is simplified. The reference voltage of the comparator 21 should preferably be set slightly at the negative side so that the transistor 19 will not close in response to a small signal in the resonant circuit 17.

The off signal is particularly effective where the resonant circuit 17 is used for resonance in addition to transmission. When the off signal is placed in an "H" level, electromagnetic waves from the outside are received by the resonant circuit 17 and transmitted to the resonant circuit 4.

The suppression signal is at "H" level for a predetermined time after the transmission signal changes from "H" to "L". However, the suppression signal may be produced by reversing the transmission signal. In this case, since there is no possibility that both the transmission signal and the suppression signal will go to "L", the off signal and the switching circuit 23 are not needed.

Figure 6:
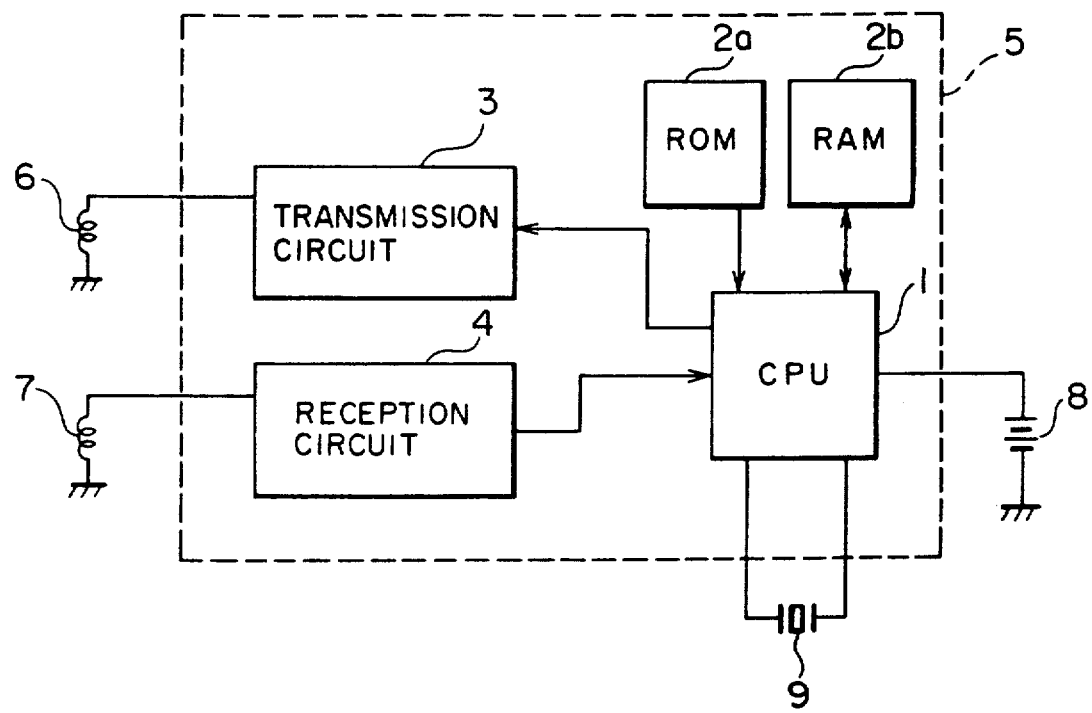
FIG. 6 is a block diagram illustrating a conventional non-contact IC card.
Figure 7:
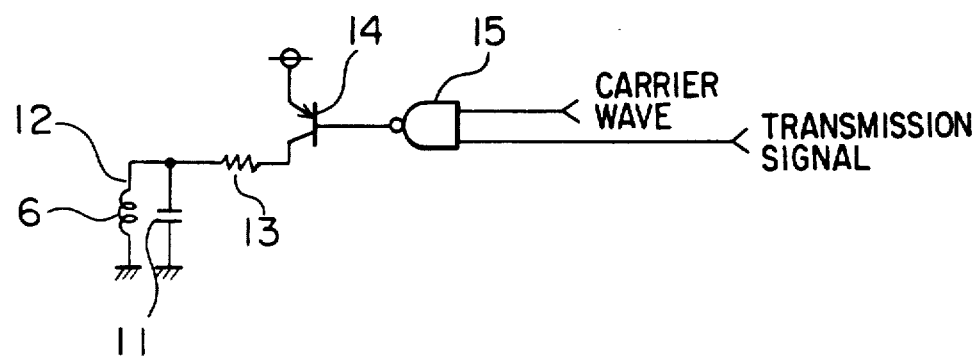
FIG. 7 is a block diagram illustrating the reception circuit in the microcomputer used in the IC card of FIG. 6.
Figure 8:
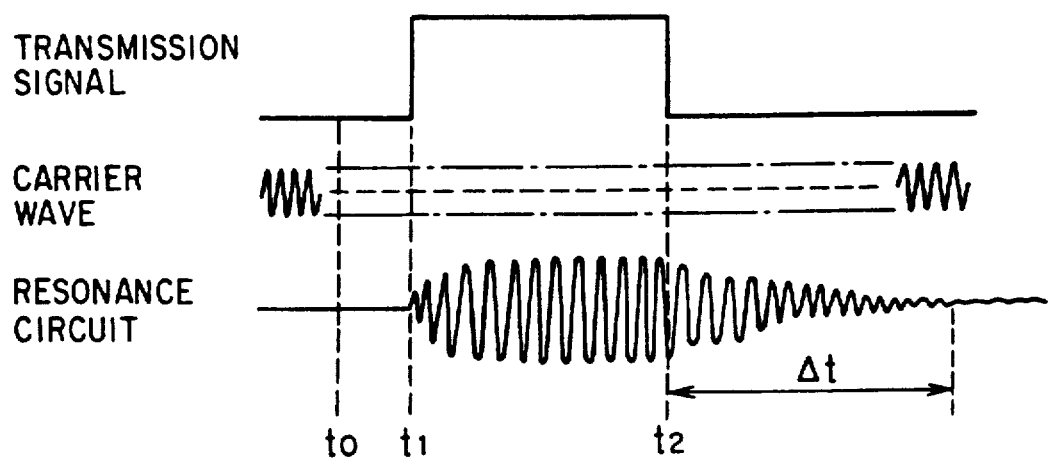
FIG. 8 is a view for signal waveforms of each section of the circuit of FIG. 7.

On the other hand, data reception in the above-mentioned embodiment is the same as that of the conventional IC card shown in FIG. 6, that is, an electromagnetic wave from an external apparatus (not shown) is received by the reception antenna 7, and after it is demodulated by the reception circuit 4, it is input to the CPU 1. After that, the CPU 1 performs data processing on the basis of a program stored in the ROM 2a, and stores data in the RAM 2b and sends data as needed.

Figure 4:
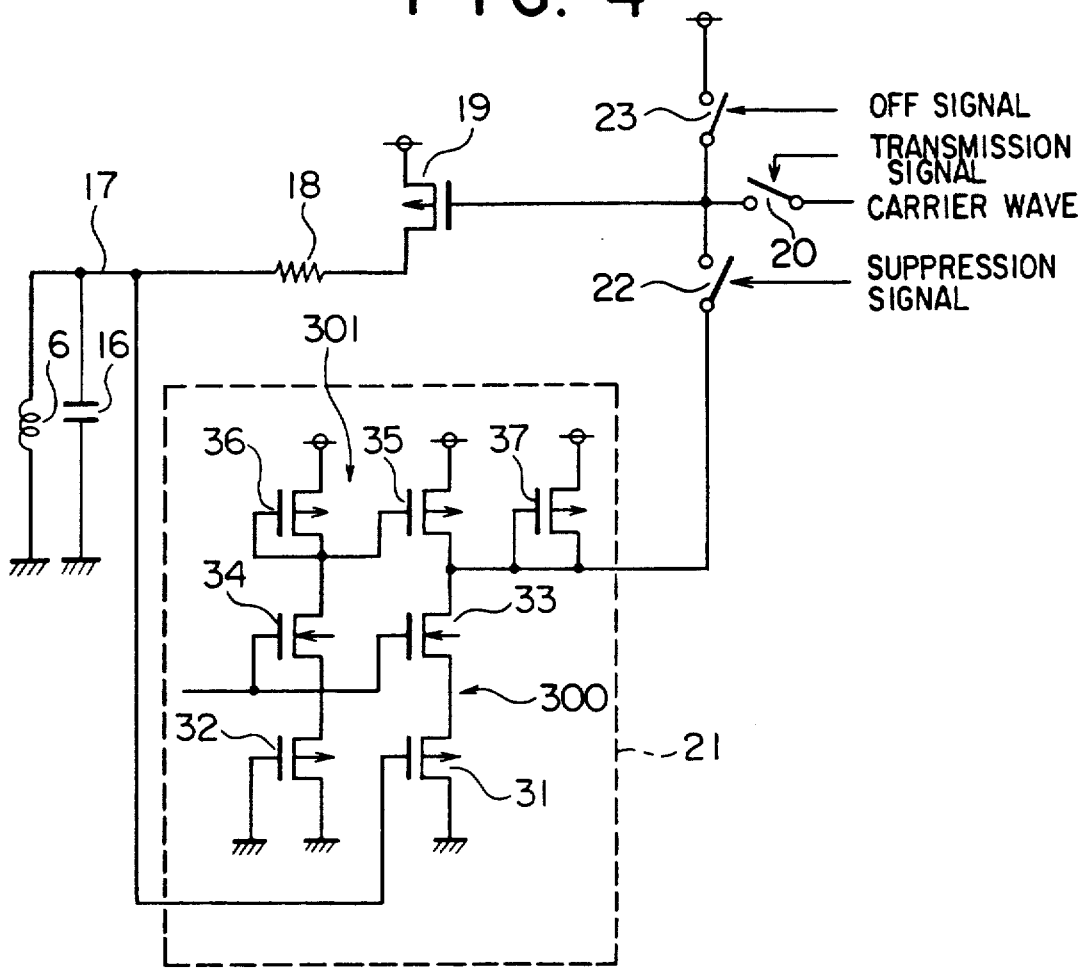
FIG. 4 is a detailed view of FIG. 2.

FIG. 4 shows the internal structure of the comparator 21. A first pair of transistors 31 and 32 and a second pair of transistors 33 and 34 constitute a differential circuit 300, that is, the respective sources of p-channel transistors 31 and 32 are connected to the sources of n-channel transistors 33 and 34, respectively, and respective gates are connected to the resonance circuit 17 and ground. A current mirror circuit 301 including a third pair of transistors 35 and 36 is connected to the differential circuit 300 as a load, that is, the drains of the p-channel transistors 35 and 36 are connected to the drains of the n-channel transistors 33 and 34, respectively. Respective gates of these transistors 35 and 36 are connected to each other, and connected to the drain of the transistor 36. A bias voltage is applied to respective gates of the second pair of transistors 33 and 34 in the differential circuit 300. The gate and drain of a p-channel transistor 37 for determining the quantity of the feedback to the transistor 19 are connected to the connection point between the transistor 33 in the differential circuit 300 and the transistor 35 in the current mirror circuit 301 and are further connected to the switching circuit 22 as the output of the comparator 21.

Figure 5:
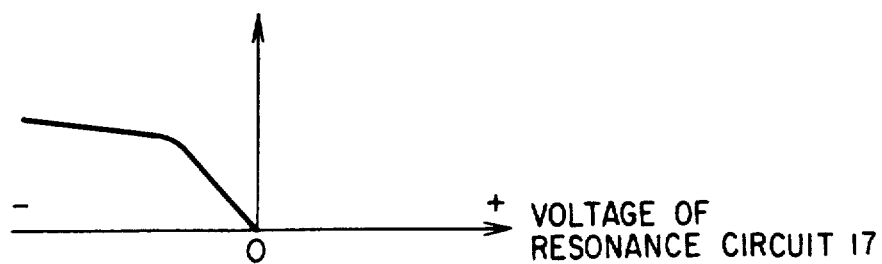
FIG. 5 is a graph of characteristics of the circuit of FIG. 4.

In the attenuation circuit 10 having this comparator 21, when the voltage of the resonant circuit 17 is positive, the amount of current flowing through the transistors 31 and 33 is smaller than that flowing through the transistors 32 and 34, and therefore the output from the comparator 21 goes to "H" and the transistor 19 is turned off. On the other hand, when the voltage of the resonant circuit 17 is negative, the current flowing through the transistors 31 and 33 becomes comparatively large. Therefore, a current flows through the p-channel transistor 37 and the output from the comparator 21 is decreased, causing the transistor 19 to turn on. However, since the output voltage of the comparator 21 varies according to the magnitude of the negative voltage of the resonant circuit 17, the driving performance of the transistor 19 varies according to the magnitude of the negative voltage of the resonant circuit 17, as shown in FIG. 5. As a result, the oscillations in the resonant circuit 17 are attenuated smoothly and in a short time.

Since the energy of the resonant circuit 17 is consumed using p-channel transistors in the circuit of FIG. 4, the circuit is suitable for integration in an IC.

What is claimed is:

1. A microcomputer circuit comprising:
a central processing unit (CPU) for processing data, for selectively generating an output signal and for generating a suppression signal immediately after ending generation of the output signal;
a resonant circuit;
an output circuit for outputting the output signal from said CPU to said resonant circuit;
attenuation means connected to said output circuit and said CPU, responsive to the suppression signal for attenuating oscillations in said resonant circuit when said CPU generates the suppression signal, and including means for reversing the phase of an oscillation voltage from said resonant circuit and means for feeding back the reversed phase oscillation voltage from said means for reversing to said resonant circuit.

2. The microcomputer circuit according to claim 1 wherein said attenuation means includes a comparator for comparing the oscillation voltage from said resonant circuit with a reference voltage and for generating a comparator signal indicative of which of the oscillation voltage and reference voltage is larger, and a switch for feeding back the comparator signal to said resonant circuit when said CPU is generating the suppression signal.

3. The microcomputer circuit according to claim 2 wherein said comparator includes a differential circuit for sensing the oscillation voltage from said resonant circuit, a current mirror circuit connected as a load to said differential circuit, and a transistor connected to said current mirror circuit for determining the magnitude of the oscillation voltage fed back to said resonant circuit.

4. A non-contact integrated circuit (IC) card comprising:
antenna means for sending and receiving data;
a central processing unit (CPU) for processing data, for selectively generating a transmission signal, and for generating a suppression signal immediately after ending generation of the transmission signal;
a reception circuit for detecting a reception signal received by said antenna means and for transmitting the reception signal to said CPU;
a transmission circuit for transmitting the transmission signal from said CPU to said antenna means; and
attenuation means connected to said transmission circuit and said CPU, responsive to the suppression signal for attenuating oscillations in said antenna means when said CPU generates the suppression signal, and including means for reversing the phase of an oscillation voltage from said antenna means and means for feeding back the reversed phase oscillation voltage from said means for reversing to said antenna means.

5. The IC card according to claim 4 wherein said attenuation means includes a comparator for comparing the oscillation voltage from said antenna means with a reference voltage and for generating a comparator signal indicative of which of the oscillation voltage and the reference voltage is larger and a switch for feeding back the comparator signal to said antenna means when said CPU generates the suppression signal.

6. The IC card according to claim 5 wherein said comparator includes a differential circuit for sensing the oscillation voltage from said antenna means, a current mirror circuit connected as a load to said differential circuit, and a transistor connected to said current mirror circuit for determining the magnitude of the oscillation voltage fed back to said antenna means.

* * * * *